United States Patent [19]

Baker

[11] 4,203,151
[45] May 13, 1980

[54] HIGH-VOLTAGE CONVERTER CIRCUIT

[75] Inventor: Richard H. Baker, Bedford, Mass.

[73] Assignee: Exxon Research & Engineering Co., Florham Park, N.J.

[21] Appl. No.: 944,634

[22] Filed: Sep. 21, 1978

[51] Int. Cl.$^2$ .......................................... H02M 7/537
[52] U.S. Cl. ..................................... 363/43; 363/132
[58] Field of Search ............................ 363/17, 41–43, 363/59–61, 131–132; 307/106–107, 110, 227, 241

[56] References Cited

U.S. PATENT DOCUMENTS

| | | | |
|---|---|---|---|
| 3,052,833 | 9/1962 | Coolidge et al. | 363/132 |
| 3,100,851 | 8/1963 | Ross et al. | 307/227 X |
| 3,227,889 | 1/1966 | Paynter | 363/43 X |
| 3,371,232 | 2/1968 | Hannan et al. | 307/110 X |
| 3,553,479 | 1/1971 | Nelson | 307/110 |
| 3,800,166 | 3/1974 | Keiner | 307/241 |
| 4,135,235 | 1/1979 | Baker | 363/43 |
| 4,137,570 | 1/1979 | Baker | 363/43 |

*Primary Examiner*—J. D. Miller
*Assistant Examiner*—Peter S. Wong
*Attorney, Agent, or Firm*—Kenneth Watov

[57] ABSTRACT

An inverter circuit includes a DC voltage supply having a plurality of voltage taps coupled via (1) a first plurality of diodes for unidirectional current flow therefrom to successive common connections between the upper half of a plurality of first transistors connected in cascade across the voltage supply, (2) a second plurality of diodes for unidirectional current flow therefrom to successive common connections between the upper half of a plurality of capacitors, of like number to the first transistors, connected in series and across the DC voltage supply via a pair of diodes providing unidirectional current between the voltage supply and capacitors, (3) a third plurality of diodes for unidirectional current flow thereto from successive common connections between the lower half of the plurality of first transistors, (4) a fourth plurality of diodes for unidirectional current flow thereto from the successive common connections between the lower half of the plurality of capacitors; and a plurality of second transistors connected in cascade across the series string of capacitors, their centralmost common connection being connected to an output terminal, individual ones of a fifth plurality of diodes being connected between successive common connections of the capacitors to and for unidirectional current flow (1) therefrom to the successive common connections between the upper half of, and (2) thereto from the successive common connections between the lower half, of the second transistors, the pluralities of first and second transistors being operable to different combinations of their conductive and nonconductive states for predetermined periods of time for producing a multitiered AC waveform at the output terminal.

13 Claims, 10 Drawing Figures

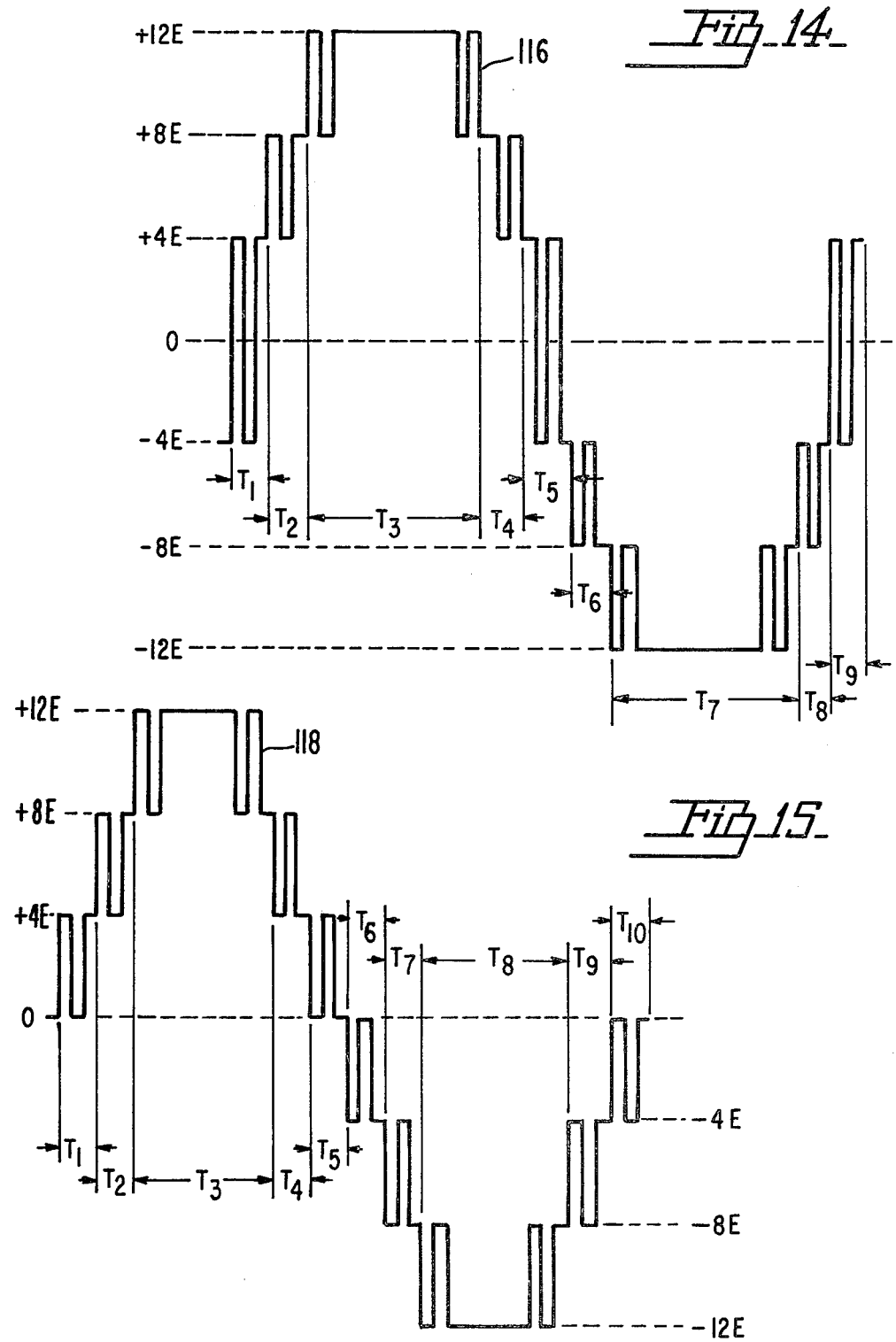

HIGH-VOLTAGE CONVERTER CIRCUIT

The field of the invention relates generally to DC to AC voltage converters, and more particularly to high-voltage converters for synthesizing a desired AC waveform.

Many different circuits are known in the art for converting a DC voltage into an AC voltage, and for synthesizing electrical waveforms. Many of these prior art circuits are limited to converting a DC voltage into a sinusoidal voltage at a fixed frequency over a restricted frequency range, and are inapplicable for relatively high voltage with high-current (high-power) applications.

The present invention is a voltage converter capable of inverting relatively high-voltage DC into a desired high-voltage AC waveform via stepwise approximation, with selectively variable frequency and in addition can deliver this high-voltage AC waveform to a load with high current. The output waveform is multitiered in that the present circuit produces this waveform via stepwise approximation. A plurality of DC sources such as batteries are connected in series between first and second terminals, and the intermediate common connection point between these DC sources is connected to a point of reference potential, ground in this example, for applying positive and negative levels of voltage to the first and second terminals, respectively, with reference to the ground. A plurality of first capacitors are connected in series between third and fourth terminals, and a like numbered plurality of second capacitors are connected in series between the fourth terminal and a fifth terminal. A plurality of first single-pole-single-throw switches (hereinafter referred to as SPST switches) equal in number to the number of first capacitors are connected in series between the first and fourth terminals, and similarly a plurality of second SPST switches are connected in series between the fourth and second terminals and are equal in number to the number of second capacitors. A plurality of third SPST switches are connected in series between the third terminal and an output terminal, and a plurality of fourth SPST switches are connected in series between the output and fifth terminals, with the number of the pluralities of fourth and fifth switches being twice that of the pluralities of first and second switches. A plurality of first diodes are individually connected from the successive common connections between the pluralities of first and second capacitors to the successive common connections between the plurality of third switches relative to said third terminal, the diodes being polarized for conducting current from the capacitors to the switches. A plurality of second diodes are individually connected between and polarized for conducting current from the common connections between the plurality of fourth switches to the successive common connections between the pluralities of first and second capacitors, relative to the output and third terminals, respectively. A plurality of third diodes are connected between and polarized for conducting current from successive nodal points in the string of DC sources to the common connection points between the plurality of first switches and to the common connection points between the plurality of first capacitors. Similarly, a plurality of fourth diodes are individually connected between and polarized for conducting current from the common connections between the plurality of second capacitors to substantially successive nodes of the string of DC sources relative to the first terminal, and from the common connections between the series string of the plurality of second switches to the same nodes. Initially, the pluralities of first through fourth switches are operable for connecting the plurality of first capacitors in series with the pluralities of first and second DC sources, for charging the string of first capacitors to a voltage equal to the sum of the individual source voltages, the polarity of the voltage being positive with respect to ground. The pluralities of first through fourth switches are also operable to another condition for charging the plurality of second capacitors to have a voltage thereacross of negative polarity with respect to ground, the voltage having a level equal to the sum of the individual DC sources of the pluralities of the first and second DC sources. Thereafter, the pluralities of first through fourth switching means are operable to different combinations of their open and closed conditions for providing bidirectional current paths between the output terminal and ground, for connecting various combinations of the batteries and capacitors in series between the output terminal and ground, at given times, for producing a multitiered predetermined waveform or AC voltage between the output terminal and ground during successive predetermined periods of time. At any given time, the circuit arrangement is such that if the voltage across the load exceeds the output voltage being applied to the load, then the circuit will act as a current sink and the load as a current source for positive levels of voltage, and vice versa for negative levels of voltage.

In the drawings, where like items are indicated by the same reference designation:

FIG. 14 shows one typical waveform of the output voltage that can be derived from the circuit of FIG. 13;

FIG. 15 shows another typical waveform that can be derived for the output voltage from the circuit of FIG. 13;

Figure 1:
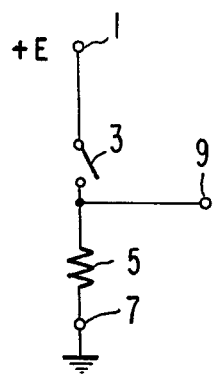
FIG. 1 is a circuit schematic diagram of a prior art DC to AC converter.
Figure 2:
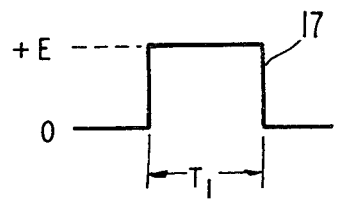
FIG. 2 is a typical waveform of the output voltage derived from the circuit of FIG. 1.

In FIG. 1, a prior art chopper circuit includes an operating voltage terminal 1 for receiving an operating voltage +E, a single-pole-single-throw switch 3 (shown as a mechanical switch for convenience, but this switch and all other SPST switches shown herein can be provided by any solid-state switch capable of performing the same function), a load resistor or current-limiting resistor 5, a reference terminal 7 for connection to ground, and an output terminal 9. As shown in FIG. 2, the circuit of FIG. 1 can be operated by closing the switch 3 for a period of time $T_1$, and thereafter reopening the switch 3 for producing the single-step waveform 17. The operating conditions for this circuit are also illustrated in Table I, where for circuit condition 1, switch 3 is in its zero state (open or turned off, this convention being used for all switches herein), causing the output signal at terminal 9 to be at ground, or the circuit is operative to a condition 2, whenever switch 3 is in its operating state 1 (closed, this convention being used for all switches herein), producing an output voltage having a level of +E. By repetitively operating the circuit of FIG. 1 between its conditions 1 and 2, for predetermined periods of time, an output voltage having a series of single-step waveforms can be obtained. In this manner, the circuit of FIG. 1 inverts the operating voltage +E into a crude AC voltage.

Figure 3:
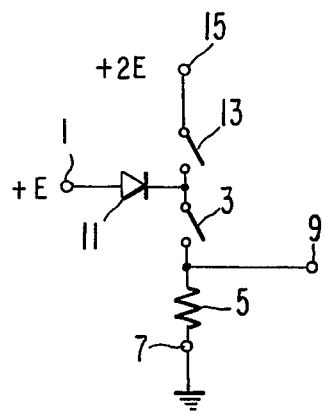
FIG. 3 is a circuit schematic diagram of a modification of the circuit of FIG. 1 for obtaining double the voltage capability.
Figure 4:
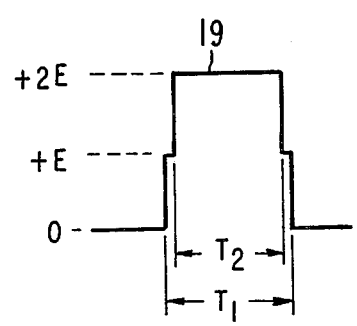
FIG. 4 is a typical waveform of the output voltage derived from the circuit of FIG. 3.

In FIG. 3, another single-pole-single-throw switch 13 (hereinafter single-pole-single-throw switches will be designated as SPST), a diode 11, and a second operating voltage terminal 15 for receiving an operating voltage +2E has been added to the circuit of FIG. 1. In Table I, the three circuit conditions for the circuit are indicated, and a typical double voltage waveform of +2E volts peak amplitude capable of being produced by the circuit of FIG. 3 is shown in FIG. 4. At the initiation of the time period $T_1$, the circuit is placed in its condition 2 and about 2 to 5 microseconds later (typical value), the circuit is placed in its condition 3; at the end of time $T_2$ the circuit is again placed into its condition 2, and about 2 to 5 microseconds later at the end of period of time $T_1$ the circuit is placed in its condition 1 with the levels of the output voltage being as shown in Table I for each one of these conditions. The diode 11 clamps the common connection between switching devices 3 and 13 to +E volts, thereby ensuring that the voltage across switch 13 in its opened or 0 state does not exceed E volts.

TABLE I

| FIG. No. | Circuit Condition | Operating State of Devices[1][2] | | | | | | Output Level |
|---|---|---|---|---|---|---|---|---|
| | | 3 | 13 | 27 | 29 | 43 | 45 | |
| 1 | 1 | 0 | — | — | — | — | — | Ground |
| | 2 | 1 | — | — | — | — | — | +E Volts |
| 3 | 1 | 0 | 0 | — | — | — | — | Ground |
| | 2 | 1 | 0 | — | — | — | — | +E Volts |
| | 3 | 1 | 1 | — | — | — | — | +2E Volts |
| 5 | 1 | — | — | 0 | 0 | — | — | Ground |
| | 2 | — | — | 1 | 0 | — | — | +E Volts |
| | 3 | — | — | 0 | 1 | — | — | −E Volts |
| 7 | 1 | — | — | 1 | 0 | 0 | 0 | +E Volts |
| | 2 | — | — | 1 | 0 | 1 | 0 | +2E Volts |
| | 3 | — | — | 0 | 0 | 0 | 0 | Ground |
| | 4 | — | — | 0 | 1 | 0 | 0 | −E Volts |
| | 5 | — | — | 0 | 1 | 0 | 1 | −2E Volts |

NOTES:
[1] Devices 3, 13, 27, 29, 43, 45 are either mechanical, vacuum tube, electromechanical or solid-state switches such as SCR's, other thyristors, transistors, and so forth.
[2] For operating states of devices 1 = turned on or closed switch, and 0 = turned off or open switch.

Also, by providing differential switching or timing in operating this circuit sequentially from its condition 1 to 2, to 3, for obtaining an output voltage having a level of +2E volts (see waveform 19), and thereafter sequentially operating the circuit from its condition 3 to 2, to 1, for returning the level of the waveform 19 back to ground or 0 volt, the voltage across switch 3 in its open or 0 state does not exceed E volts, thereby permitting a double voltage waveform of +2E volts to be obtained using switching devices 3 and 13 rated at only E volts. The differential timing used in operating the switching devices 3 and 13 sequentially to their closed conditions, and then sequentially back to their open conditions, separates the switching dynamics of the two switches for ensuring that the voltage across each switch is limited to E volts.

Figure 5:
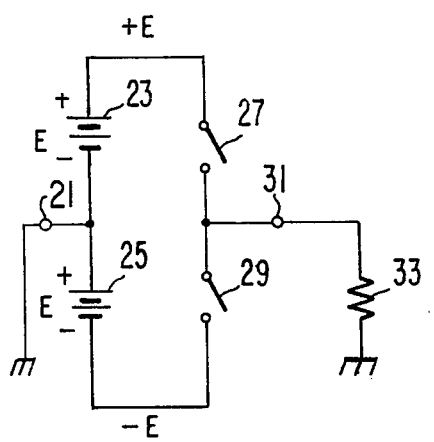
FIG. 5 is a schematic diagram of a double-ended switching circuit configuration representing an extension of the single-ended configuration of FIG. 1.
Figure 6:
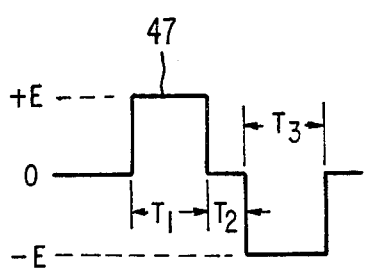
FIG. 6 shows a typical waveform of the output voltage derived from the circuit of FIG. 5.

In FIG. 5, essentially two of the single-switch circuits of FIG. 1 are connected in a push-pull configuration, for producing the dual polarity single voltage waveform 47 shown in FIG. 6. In Table I, the concurrent operating states of the switches 27 and 29 are shown for obtaining three circuit conditions 1,2 and 3. In condition 1, with switches 27 and 29 open, the grounded load 33 terminated to ground causes the level of voltage at output terminal 31 to be at ground or 0 volt (assuming that the ground connection is not floating). Prior to time period $T_1$, during time period $T_2$, and after time period $T_3$, (all of waveform 47), the circuit is in condition 1. During time period $T_1$, the circuit is in its condition 2, for connecting the DC source (hereafter called battery) 23 between reference terminal 21 and output terminal 31 for applying +E volts across the load 33. During time period $T_3$ the circuit is placed in its condition 3, thereby connecting the battery 25 between terminals 21 and 31 for applying −E volts across the load 33.

Figure 7:
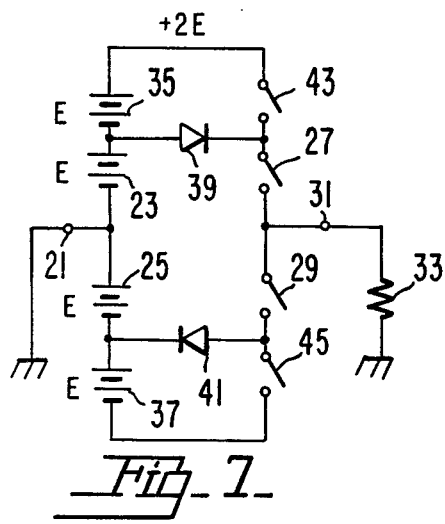
FIG. 7 is a circuit schematic diagram of an extension of the circuit of FIG. 3 to a double switch push-pull configuration.
Figure 8:
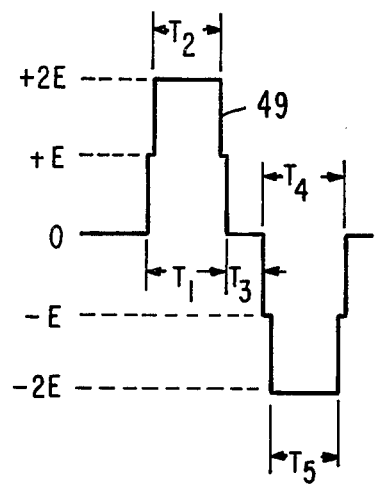
FIG. 8 shows a typical waveform of the output voltage derived from the circuit of FIG. 7.

In FIG. 7, essentially two of the circuits of FIG. 3 are connected into a new double-switch push-pull configuration for producing a double voltage waveform typical of the waveform of FIG. 8. In order words, the circuit of FIG. 7 is an extension of the circuit of FIG. 5, whereby in the former batteries 35 and 37, diodes 39 and 41, and switches 43 and 45 have been added, for permitting the production of the double-voltage waveform 49 having a peak amplitude of +2E or −2E volts, with switching devices 27,29,43 and 45 having voltage ratings of E volts. To ensure that switch 27 is never overstressed voltagewise, switch 43 must never be closed at times that switch 27 is open, and similarly to ensure that switch 29 is not overstressed voltagewise, switch 45 must never be closed at times that switch 29 is open. The waveform 49 is obtained by operating the circuit to its condition 1 for the initiation of time period $T_1$, to condition 2 for the initiation of time period $T_2$, to its condition 1 at the end of time period $T_2$, to condition 3 at the initiation of time period $T_3$ and termination of time period $T_1$, to condition 4 at the initiation of time period $T_4$, to condition 5 at the initiation of time period $T_5$, back to condition 4 at the termination of time period $T_5$, and to condition 3 at the end of time period $T_4$. A more detailed explanation of the operation of the circuit of FIG. 7, and other circuits embodying the concepts of the circuit of FIG. 7 into more complicated circuit configurations, are taught in my co-pending application Ser. No. 944,632 for FLOATING TRANSISTORIZED SWITCH, filed on the same data herewith.

Figure 9:
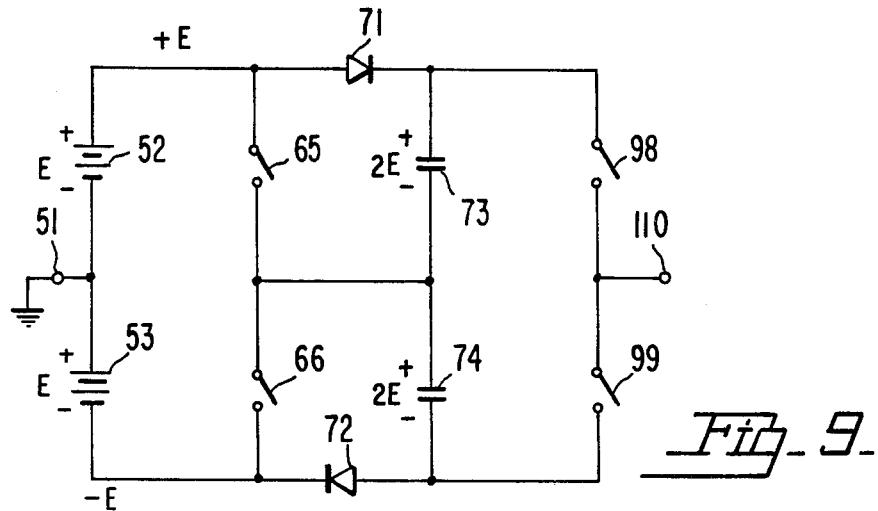
FIG. 9 is a circuit schematic diagram of a synthesizer circuit for generating three-tier waveforms.
Figure 10:
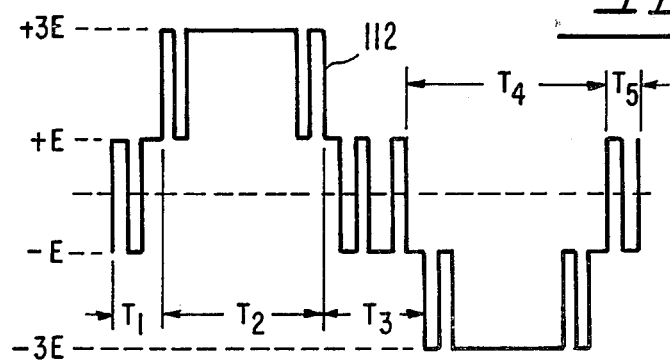
FIG. 10 shows a typical waveform obtained from the circuit of FIG. 9.

In FIG. 9, a circuit for inverting DC voltages having levels such as +E and —E volts into an AC voltage waveform typical of that shown in FIG. 10 having a positive peak amplitude of +3E volts and negative peak amplitude of —3E volts and (in this example being a stepwise approximation of a sinusoidal waveform). The inverter circuit includes batteries 52 and 53 for providing DC operating voltages +E volts and —E volts, respectively, a reference voltage terminal 51 for connection to a point of reference potential, in this example ground, for SPST switching devices 65, 66, 98 and 99, diodes 71 and 72, capacitors 73 and 74, and an output terminal 110, the circuit components being arranged as shown. In Table II, the eight practical circuit conditions are shown, wherein as previously mentioned, a 1 operating state indicates that a particular switching device is closed for conducting current, and a 0 indicates that a particular switching device is open-circuited or turned off. Initially, the inverter circuit is operated to its condition 1 (switch 65 closed and switch 66 open) for charging capacitor 74, and then to its condition 2 (switch 65 open and switch 66 closed) for charging capacitor 73, but not necessarily in the order given. After initializing the inverter circuit, the circuit is operated into various ones of its conditions for predetermined periods of time in a predetermined sequence for producing some desired output waveform, such as shown in FIG. 10, for example.

TABLE II

| FIG. No. | Circuit Condition | Operating State of Devices | | | | | | Output Level (Volts) |
|---|---|---|---|---|---|---|---|---|
| | | 65 | 66 | 97 | 98 | 99 | 100 | |
| 9 | 1 | 1 | 0 | — | 0 | 0 | — | $C_{74}$ Charging; Output Floating |
| | 2 | 0 | 1 | — | 0 | 0 | — | $C_{73}$ Charging; Output Floating |
| | 3 | 0 | 0 | — | 1 | 0 | — | +E |
| | 4 | 0 | 1 | — | 1 | 0 | — | +E; $C_{73}$ Charging* |
| | 5 | 1 | 0 | — | 1 | 0 | — | +E; $C_{74}$ Charging* |
| | 6 | 0 | 0 | — | 0 | 1 | — | —E |
| | 7 | 1 | 0 | — | 0 | 1 | — | —E, $C_{74}$ Charging* |
| | 8 | 0 | 1 | — | 0 | 1 | — | —3E* |
| 11 | 1 | 1 | 0 | 0 | 0 | 0 | 0 | $C_{74}$ Charging; Output Floating |
| | 2 | 0 | 1 | 0 | 0 | 0 | 0 | $C_{73}$ Charging; Output Floating |
| | 3 | 0 | 0 | 1 | 1 | 0 | 0 | +2E |
| | 4 | 0 | 1 | 1 | 1 | 0 | 0 | +2E, $C_{73}$ Charging* |
| | 5 | 1 | 0 | 0 | 1 | 1 | 0 | +2E, $C_{74}$ Charging* |
| | 6 | 1 | 0 | 1 | 1 | 0 | 0 | +6E, $C_{74}$ Charging* |
| | 7 | 0 | 0 | 0 | 0 | 1 | 1 | —2E |
| | 8 | 1 | 0 | 0 | 0 | 1 | 1 | —2E, $C_{74}$ Charging* |
| | 9 | 0 | 1 | 0 | 1 | 1 | 0 | —E, $C_{73}$ Charging* |

TABLE II-continued

| FIG. No. | Circuit Condition | Operating State of Devices | | | | | | Output Level (Volts) |
|---|---|---|---|---|---|---|---|---|
| | | 65 | 66 | 97 | 98 | 99 | 100 | |
| | 10 | 0 | 1 | 0 | 0 | 1 | 1 | —6E, $C_{73}$ Charging* |

Notes:
*Preferred condition for obtaining the output level indicated.

The asterisks indicate preferred circuit conditions for obtaining the output level indicated, these conditions being preferred because when the circuit is in one of these preferred conditions a particular capacitor is recharged, permitting more efficient operation of the circuit and higher frequency operation thereof, as would be obvious to one skilled in the art. The open circuit voltage rating of the switches 65 and 66 must be at least 2E volts, and of switches 98 and 99 at least 4E volts. One example of the operation of this circuit is for producing the three-tier approximation to a sinusoidal waveform shown as waveform 112 in FIG. 10. At the initiation of time period $T_1$ the inverter is placed in its condition 4 for a given time, and then to its condition 7 for another period of time, then back to its condition 4 for the remainder of time period $T_1$. At the initiation of time period $T_2$ the circuit is placed into its condition 5, and during this time period $T_2$, the circuit is alternately switched between its conditions 4 and 5 to produce the notch pattern shown. Similarly, during time period $T_3$, the circuit is alternately switched between its conditions 4 and 7 for producing the notch pattern shown during that time; also during time period $T_4$, the circuit is alternately switched between its conditions 7 and 8, and during time period $T_5$ the circuit is switched alternately between its conditions 4 and 7. A more detailed explanation of the operation of inverter circuit of FIG. 9 is given in my copending application U.S. Ser. No. 846,696, for *SYNTHESIZER CIRCUIT FOR GENERATING THREE-TIER WAVEFORMS*, filed on Oct. 31, 1977, now U.S. Pat. No. 4,135,235.

Figure 11:
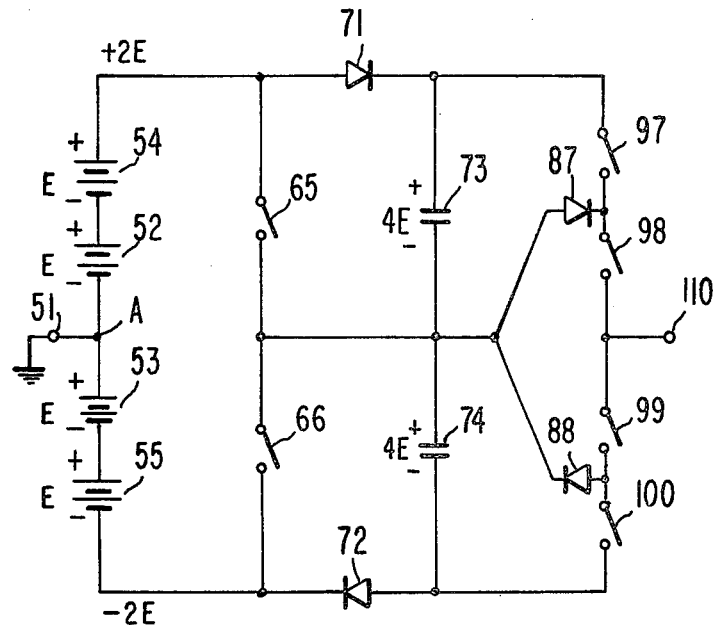
FIG. 11 is a circuit schematic diagram of a first embodiment of the present invention.

In FIG. 11, a first embodiment of the invention is a modification of the circuit of FIG. 9 to include voltage-limiting concepts taught by the circuit of FIG. 7. The new inverter circuit of FIG. 11 includes the addition of diodes 87 and 88, SPST switches 97 and 100, and batteries 54 and 55, in the configuration shown with the comparable elements of FIG. 9. As shown in Table II, there are ten practical circuit conditions for operating the inverter circuit of FIG. 11. The switching devices 65,66,97–100 must each have an open circuit voltage rating of at least 4E volts. Also, to avoid overvoltage stressing of switching device 98, switching device 97 must never be closed at times that switching device 98 is open; similarly, to avoid overvoltage stressing of switching device 99, switching device 100 must never be closed at times that switching device 99 is open. Note also that batteries 52 and 54 can be combined into a single battery for producing +2E volts, and batteries 53 and 55 can be combined into a single battery for producing —2E volts.

Figure 12:
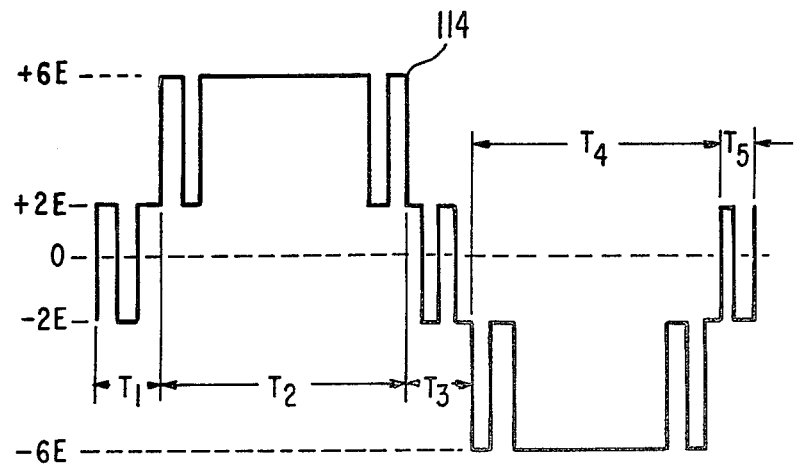
FIG. 12 shows a typical waveform of the output voltage derived from the circuit of FIG. 11.

In the operation of the circuit of FIG. 11, with reference to Table II, waveform 114 of FIG. 12 is generated by first initializing by sequentially placing the circuit into conditions 1 and 2, and then alternately operating the circuit between its conditions 5 and 9, during time periods $T_1$, $T_3$ and $T_5$; during time period $T_2$ alternately operating between conditions 5 and 6, and during time period $T_4$, alternately operating between conditions 8 and 10. In this manner, by operating the circuit alternately between two different circuit conditions within given periods of time $T_1$ through $T_5$, the notched stepwise approximation of a sinusoid represented by waveform 114 is obtained. From Table II, it is shown that other combinations of circuit conditions than the ones illustrated above can be used in obtaining the waveform 114, or any other practical waveform of a desired shape and frequency. Note that in the circuit of FIG. 11, as in the following circuits of other embodiments of the present invention, antiparallel or inverse parallel diodes are not shown connected across each one of the switching devices of the particular circuit such as 65,66,97,98,99 and 100 for the sake of simplicity. In a practical circuit, where these switching devices can consist of like conductivity bipolar transistors, for example, such inverse parallel diodes would be connected across the transistors, for permitting the circuit to drive reactive loads such as the inductive windings of a motor. Note also that in comparing the typical waveform 112 derived from the circuit of FIG. 10 with the typical waveform 114 derived from the first embodiment of the invention shown in FIG. 11, that the latter circuit is capable of inverting DC voltages twice the magnitude of the former circuit into AC waveforms having peak-to-peak voltages that are twice that of the waveforms produced by the former circuit, without requiring a doubling of the voltage rating of the switching devices 65,66,97,98,99 or 100. Note that when the circuit of FIG. 11 is in condition 3, if the voltage across the load (assume that a load is connected between output terminal 110 and reference terminal 51) exceeds +6E volts, then current will flow from the load into output terminal 110, through the main current conduction paths of switching devices 97,98 (or antiparallel diodes connected across each device) and therefrom through the series circuit of capacitors 73 and 74, diode 72, batteries 55 and 53, and reference terminal 51 to ground. When the circuit is in condition 4, if the voltage across the load exceeds +2E volts, then current will flow from the load into output terminal 110, through switching devices 97 and 98 (or antiparallel diodes connected thereacross), and the series circuit including capacitor 73, the main current conduction path of switching device 66, the batteries 53 and 55 and reference terminal 51 to ground. If the voltage across the load is not greater than +2E volts, then in conditions 3 or 4, current is delivered from output terminal 110 to the load. In circuit condition 5, when the voltage across the load is less than +2E volts, current is delivered to the load from the series circuit including batteries 52, 54, the main current conduction path of switching device 65, diode 87, and the main current conduction path of switching device 98. If at this time the voltage across the load exceeds +2E volts, then current will flow from the load into output terminal 110 and through the series circuit including the main current conduction paths of switches 65 and 99, diode 88, the batteries 52 and 54, and reference terminal 51 to ground. Similarly, when the circuit is in condition 6, and the level of the voltage across the load below +6E volts then current will be delivered to the load from batteries 52 and 54, through the series circuit including the main conduction path of switching device 65, capacitor 73, and the main current conduction paths of switches 97 and 98, to output terminal 110 and into the load. If at this time the voltage across the load is greater than +6E volts, then current will flow through the series circuit including the antiparallel diodes (not shown), connected across switches 97 and 98, capacitor 73, through the antiparallel diode across switch 65 (not shown), the batteries 52 and 54, and reference terminal 51 to ground. Similar bidirectional current paths are available for all other circuit conditions, as would be obvious to one skilled in the art. As previously mentioned, by providing these bidirectional current paths for each condition of the circuit, reactive loads can be driven by the circuit up to the power capability of the circuit.

Figure 13:
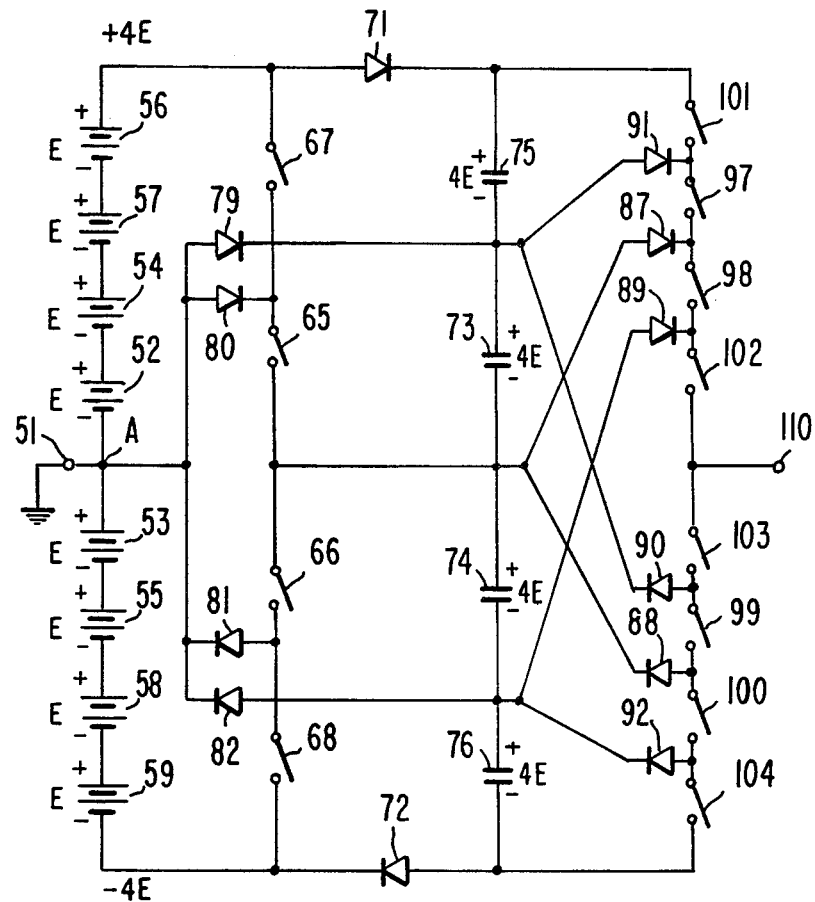
FIG. 13 is a circuit schematic diagram of a second embodiment of the present invention.

In FIG. 13, a second embodiment of the invention is shown, the circuit being an extension of the embodiment of the invention shown in FIG. 11. In FIG. 13, SPST switching devices 67,68, 101 through 104, diodes 79 through 82 and 89-92, and batteries 56 through 59 have been added to the circuit configuration of FIG. 11, for increasing the voltage capability and number of levels or tiers in the output waveform available from the inverter circuit. In operating the inverter circuit of FIG. 13, there are about 15 practical circuit conditions as shown in Table III. A typical five-tier waveform having a dynamic zero that can be obtained from the inverter of FIG. 13 is shown in FIG. 14, and a typical six-tier or level waveform having a static zero is shown in FIG. 15.

TABLE III

| FIG. 13 Circuit Cond. | OPERATING STATE OF DEVICES ||||||||||||  Output Level in Volts |
|---|---|---|---|---|---|---|---|---|---|---|---|---|---|
| | 65 | 66 | 67 | 68 | 97 | 98 | 99 | 100 | 101 | 102 | 103 | 104 | |
| 1 | 0 | 1 | 0 | 1 | 0 | 0 | 0 | 0 | 0 | 0 | 0 | 0 | $C_{73}$ and $C_{75}$ charging; Output floating |
| 2 | 1 | 0 | 1 | 0 | 0 | 0 | 0 | 0 | 0 | 0 | 0 | 0 | $C_{74}$ and $C_{76}$ charging; Output floating |
| 3 | 1 | 1 | 0 | 0 | 0 | 1 | 1 | 0 | 0 | 1 | 1 | 0 | 0 |
| 4 | 1 | 0 | 1 | 0 | 0 | 1 | 1 | 0 | 0 | 1 | 1 | 0 | +4E, $C_{74}$ & $C_{76}$ charging |
| 5 | 0 | 1 | 0 | 1 | 1 | 1 | 0 | 0 | 1 | 1 | 0 | 0 | +4E, $C_{73}$ & $C_{75}$ charging |
| 6 | 1 | 1 | 0 | 0 | 1 | 1 | 0 | 0 | 1 | 1 | 0 | 0 | +4E |
| 7 | 1 | 0 | 1 | 0 | 1 | 1 | 0 | 0 | 1 | 1 | 0 | 0 | +8E, $C_{74}$ & $C_{76}$ charging |
| 8 | 1 | 1 | 0 | 0 | 1 | 1 | 0 | 0 | 1 | 1 | 0 | 0 | +8E, gated ground path |
| 9 | 1 | 0 | 1 | 0 | 1 | 1 | 0 | 0 | 1 | 1 | 0 | 0 | +12E, $C_{74}$ & $C_{76}$ charging |
| 10 | 0 | 1 | 0 | 1 | 0 | 1 | 1 | 0 | 0 | 1 | 1 | 0 | −4E, $C_{73}$ & $C_{75}$ charging |
| 11 | 1 | 0 | 1 | 0 | 0 | 1 | 1 | 0 | 0 | 1 | 1 | 1 | −4E, $C_{74}$ & $C_{76}$ charging |
| 12 | 1 | 1 | 0 | 0 | 0 | 0 | 1 | 1 | 0 | 1 | 1 | 0 | −4E, gated power path |
| 13 | 0 | 1 | 01 | 1 | 0 | 0 | 1 | 1 | 0 | 1 | 1 | 0 | −8E, $C_{73}$ & $C_{75}$ charging |
| 14 | 1 | 1 | 0 | 0 | 0 | 0 | 1 | 1 | 0 | 0 | 1 | 1 | −8E, gated ground path |
| 15 | 0 | 1 | 0 | 1 | 0 | 0 | 1 | 1 | 0 | 0 | 1 | 1 | −12E, $C_{73}$ & $C_{75}$ charging |

In operating the second embodiment of the invention shown in FIG. 13, the circuit is initially placed in its condition 1 and then in its condition 2, but not necessarily in that order, for charging the capacitors $C_{73}$ and $C_{75}$ and $C_{74}$ and $C_{76}$, respectively. Thereafter, the waveform 116 of FIG. 14, is obtained by alternately operating the circuit between either one of its conditions, 4,5 or 6, and either one of its conditions 10,11, or 12 during the time periods $T_1$, $T_5$ and $T_9$; alternately between either one of its conditions 7 or 8, and either one of its conditions 4,5 or 6 during time periods $T_2$ and $T_4$; between either one of conditions 7 or 8, and condition 9, during time period $T_3$; between either one of conditions 10,11 or 12, and either one of conditions 13 or 14 during time periods $T_6$ and $T_8$; and finally alternately operating between either one of conditions 13 or 14, and condition 15, during the time period $T_7$. To produce waveform 118 of FIG. 15, the circuit of FIG. 13 is first initialized via conditions 1 and 2 and then alternately operated between its condition 3, and either one of its conditions 4,5 or 6 during time periods $T_1$ and $T_5$; between either one of its conditions 4,5 or 6, and either one of conditions 7 or 8, during time periods $T_2$ and $T_4$; alternately between either one of conditions 7 or 8, and condition 9, during time period $T_3$; alternately between condition 3, and either one of conditions 10,11 or 12, during time periods $T_6$ and $T_{10}$; alternately between either one of conditions 10,11 or 12, and either one of conditions 13 or 14, during time periods $T_7$ and $T_9$; and alternately between either one of conditions 13 or 14, and condition 15, during time period $T_8$.

Figure 16:
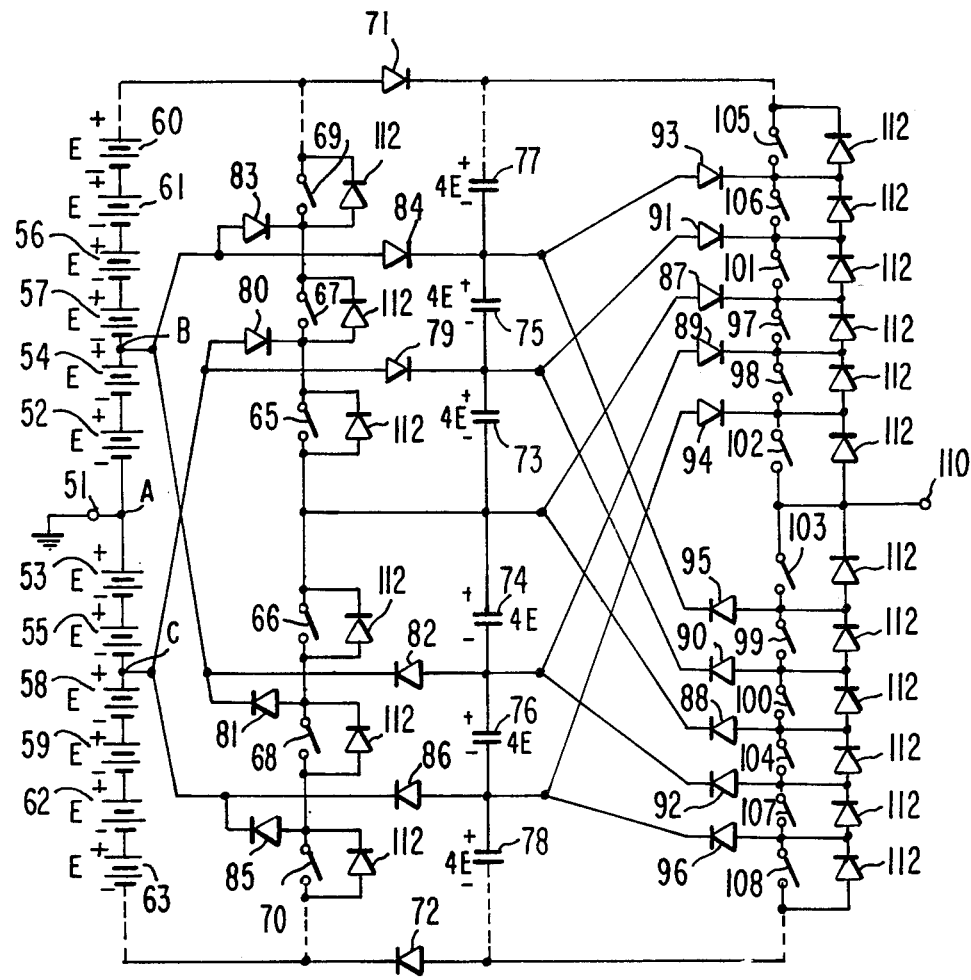
FIG. 16 is a circuit schematic diagram of a third embodiment of the invention, also showing that other higher embodiments of the present invention are obtainable in order of progression as established from the first, to the second, to the third embodiments.

In FIG. 16, a third embodiment of the invention is shown, which is an extension of the second embodiment of FIG. 13. The extension is obtained by the addition of switches 69 and 70 into what is hereinafter designated as a first bank of switches 65–70, diodes 83 through 86, capacitors 77 and 78, SPST switches 105 through 108 into what is hereinafter designated as a second bank of switches 97–108, diodes 93 through 96, and batteries 60 through 63. Also, antiparallel diodes 112 are shown connected in inverse parallel across each one of the switches 65–70, and 97–108, assuming that these series-connected switches are as in usual practice a cascoded string of transistors (see FIG. 19). As previously mentioned, for simplicity, these antiparallel diodes 112 are not shown in the first and second embodiments of the invention of FIGS. 12 and 13, respectively. Terminals 113, 115, 117, 119 and 121 have also been added. The dashed lines in the circuit are included to show that this third embodiment can be extended into N embodiments, as will be discussed latter.

TABLE IV

| FIG. 16 Circuit Cond. | OPERATING STATE OF DEVICES | | | | | | | | | | | | | | | | | Output Level in Volts |
|---|---|---|---|---|---|---|---|---|---|---|---|---|---|---|---|---|---|---|
| | 65 | 66 | 67 | 68 | 69 | 70 | 97 | 98 | 99 | 100 | 101 | 102 | 103 | 104 | 105 | 106 | 107 | 108 | |
| 1 | 1 | 0 | 1 | 0 | 1 | 0 | 0 | 0 | 0 | 0 | 0 | 0 | 0 | 0 | 0 | 0 | 0 | 0 | Output floating; $C_{74}$, $C_{76}$, $C_{78}$ charging |
| 2 | 0 | 1 | 0 | 1 | 0 | 1 | 0 | 0 | 0 | 0 | 0 | 0 | 0 | 0 | 0 | 0 | 0 | 0 | Output floating; $C_{73}$, $C_{75}$, $C_{77}$ charging |
| 3 | 0 | 1 | 0 | 1 | 0 | 1 | 1 | 1 | 0 | 0 | 1 | 1 | 1 | 0 | 0 | 1 | 0 | 0 | $+2E$; $C_{73},C_{75},C_{77}$ charging |
| 4 | 1 | 1 | 1 | 0 | 0 | 0 | 1 | 1 | 1 | 1 | 0 | 1 | 1 | 0 | 0 | 0 | 0 | 0 | $+2E$ |
| 5 | 1 | 0 | 1 | 0 | 1 | 0 | 1 | 1 | 1 | 1 | 0 | 1 | 1 | 0 | 0 | 0 | 0 | 0 | $+6E$; $C_{74},C_{76},C_{78}$ charging |
| 6 | 0 | 1 | 0 | 1 | 0 | 1 | 1 | 1 | 0 | 0 | 1 | 1 | 0 | 0 | 1 | 1 | 0 | 0 | $+6E$; $C_{73},C_{75},C_{77}$ charging |
| 7 | 1 | 1 | 0 | 1 | 0 | 0 | 1 | 1 | 0 | 0 | 1 | 1 | 1 | 0 | 0 | 0 | 0 | 0 | $+6E$ |
| 8 | 1 | 0 | 1 | 0 | 1 | 0 | 1 | 1 | 0 | 0 | 1 | 1 | 1 | 0 | 0 | 0 | 0 | 0 | $+10E$; $C_{74},C_{76},C_{78}$ charging |
| 9 | 1 | 1 | 1 | 0 | 0 | 0 | 1 | 1 | 0 | 0 | 1 | 1 | 1 | 0 | 0 | 1 | 0 | 0 | $+10E$ |
| 10 | 1 | 1 | 1 | 0 | 0 | 0 | 1 | 1 | 0 | 0 | 1 | 1 | 0 | 0 | 1 | 1 | 0 | 0 | $+14E$ |
| 11 | 1 | 0 | 1 | 0 | 1 | 0 | 1 | 1 | 0 | 0 | 1 | 1 | 1 | 0 | 0 | 1 | 0 | 0 | $+14E$; $C_{74},C_{76},C_{78}$ charging |
| 12 | 1 | 0 | 1 | 0 | 1 | 0 | 1 | 1 | 0 | 0 | 1 | 1 | 0 | 0 | 1 | 1 | 0 | 0 | $+18E$; $C_{74},C_{76},C_{78}$ charging |
| 13 | 1 | 0 | 1 | 0 | 1 | 0 | 0 | 0 | 1 | 1 | 0 | 1 | 1 | 1 | 0 | 0 | 1 | 0 | $-2E$; $C_{74},C_{76},C_{78}$ charging |
| 14 | 1 | 1 | 0 | 1 | 0 | 0 | 1 | 1 | 1 | 1 | 0 | 1 | 1 | 0 | 0 | 0 | 0 | 0 | $-2E$; |
| 15 | 0 | 1 | 0 | 1 | 0 | 1 | 1 | 1 | 1 | 1 | 0 | 1 | 1 | 0 | 0 | 0 | 0 | 0 | $-6E$; $C_{73},C_{75},C_{77}$ charging |
| 16 | 1 | 0 | 1 | 0 | 1 | 0 | 0 | 0 | 1 | 1 | 0 | 0 | 1 | 1 | 0 | 0 | 1 | 1 | $-6E$; $C_{74},C_{76},C_{78}$ charging |
| 17 | 1 | 1 | 0 | 1 | 0 | 0 | 1 | 1 | 1 | 1 | 0 | 1 | 1 | 0 | 0 | 0 | 0 | 0 | $-6E$ |
| 18 | 0 | 1 | 0 | 1 | 0 | 1 | 1 | 1 | 1 | 0 | 1 | 1 | 1 | 0 | 0 | 0 | 0 | | $-10E$; $C_{73},C_{75},C_{77}$ charging |
| 19 | 1 | 1 | 0 | 1 | 0 | 0 | 0 | 0 | 1 | 1 | 0 | 1 | 1 | 1 | 0 | 0 | 1 | 0 | $-10E$ |
| 20 | 1 | 1 | 0 | 1 | 0 | 0 | 0 | 0 | 1 | 1 | 0 | 0 | 1 | 1 | 0 | 0 | 1 | 1 | $-14E$ |
| 21 | 0 | 1 | 0 | 1 | 0 | 1 | 0 | 0 | 1 | 1 | 0 | 1 | 1 | 1 | 0 | 0 | 1 | 0 | $-14E$; $C_{73},C_{75},C_{77}$ charging |
| 22 | 0 | 1 | 0 | 1 | 0 | 1 | 0 | 0 | 1 | 1 | 0 | 0 | 1 | 1 | 0 | 0 | 1 | 1 | $-18E$; $C_{73},C_{75},C_{77}$ charging |

Figure 17:
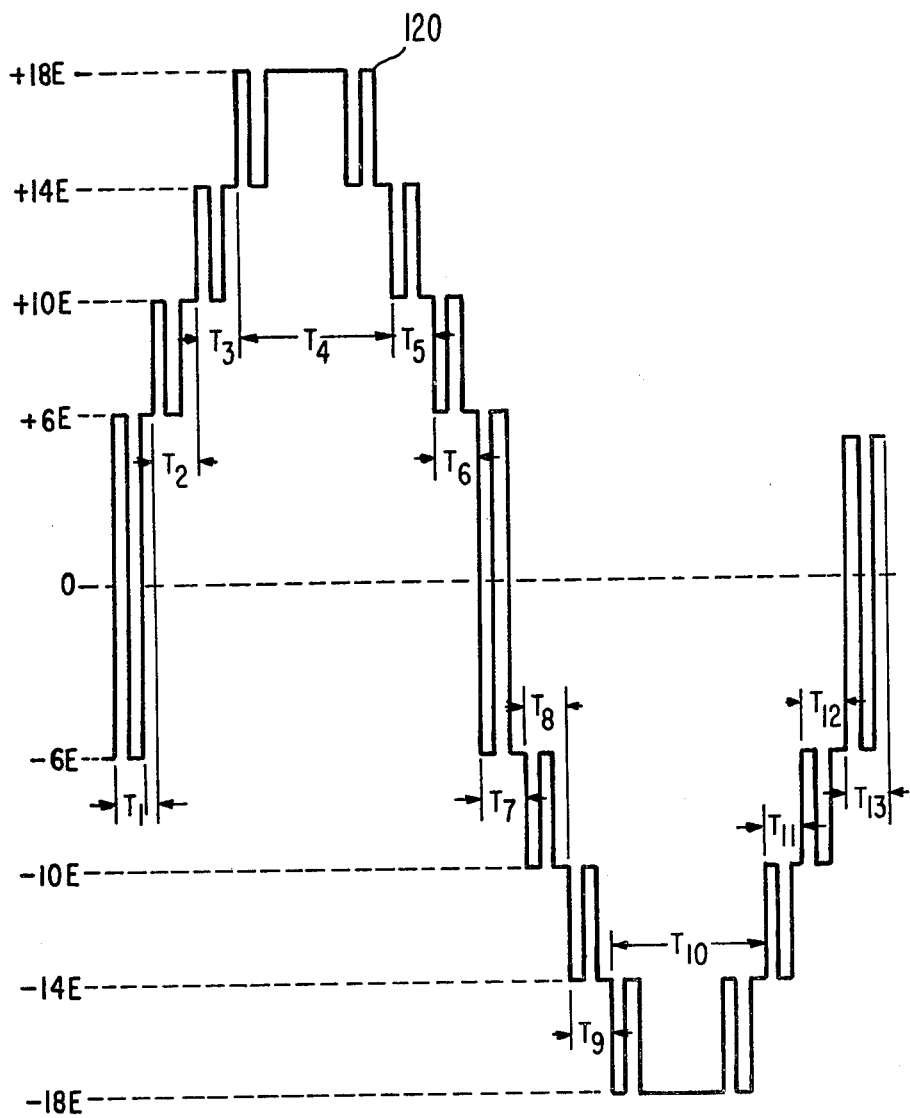
FIG. 17 shows one typical waveform of the output voltage derived from the circuit of FIG. 16.
Figure 18:
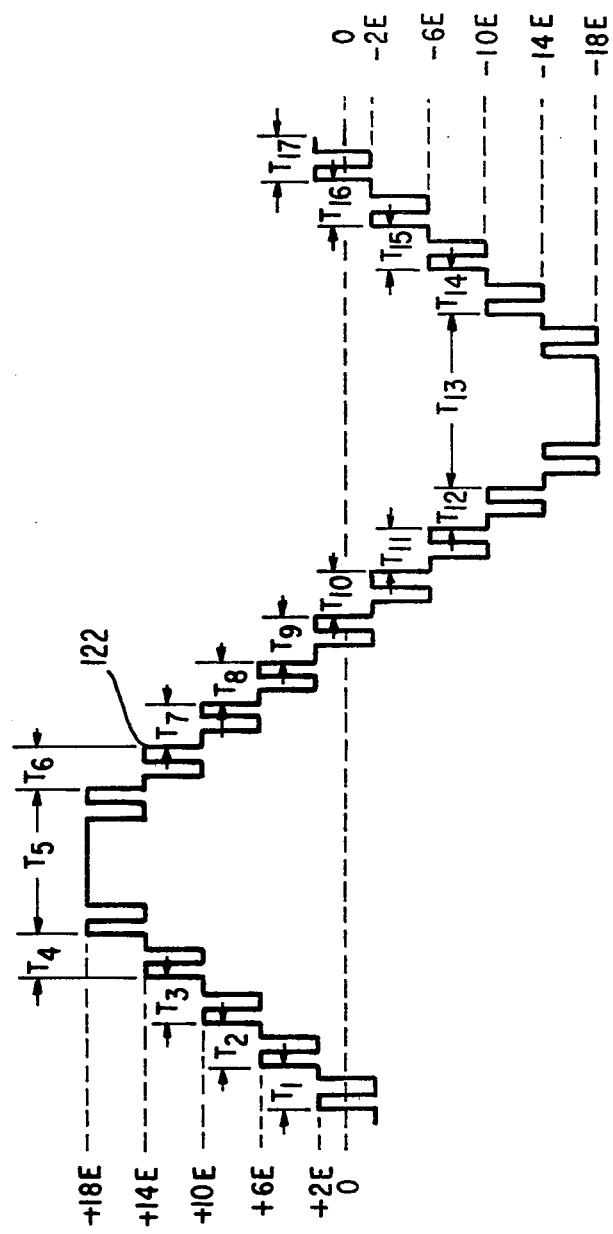
FIG. 18 shows another typical waveform that is derivable as the output voltage of the circuit of FIG. 16.

In the operation of the circuit of FIG. 16, the output voltage produced between output terminal 110 and reference terminal 51 can be synthesized as the stepwise approximated waveform of substantially any practical waveform by sequentially operating the circuit into various ones of its circuit conditions (see Table IV), for predetermined periods of time, in a repetitive fashion. Typical sinusoidal waveforms that can be stepwise approximated are shown in FIGS. 17 and 18. In operating this circuit, initially it is placed first into one and then the other of its conditions 1 and 2, for periods of time sufficient for charging capacitors $C_{74}$, $C_{76}$, $C_{78}$ and $C_{73}$, $C_{75}$, $C_{77}$, respectively. After initialization for producing the waveform 120 of FIG. 17, the circuit is alternately operated between either one of its conditions 5,6 or 7 and either one of conditions 15, 16 or 17, during time periods $T_1$, $T_7$ and $T_{13}$; between either one of its conditions 5,6 or 7 and either one of 8 or 9, during time periods $T_2$ and $T_6$; alternately between either one of its conditions 8 or 9 and either one of conditions 10 or 11, during time periods $T_3$ and $T_5$; alternately between either one of its conditions 10 or 11, and condition 12, during time period $T_4$; alternately between either one of conditions 15,16 or 17 and either one of conditions 18 or 19, during time periods $T_8$ and $T_{12}$; alternately between either one of conditions 18 or 19 and either one of conditions 20 and 21, during time periods $T_9$ and $T_{11}$; and alternately between either one of conditions 20 or 21, and condition 22, during time period $T_{10}$. Similarly, the circuit is operated for synthesizing waveform 122 of FIG. 18 by initially charging capacitors $C_{73}$–$C_{78}$, as before, and then alternately operating the circuit between either one of conditions 3 or 4, and either one of conditions 13 or 14, during time periods $T_1$, $T_9$ and $T_{17}$; between either one of conditions 3 or 4 and either one of 5,6 or 7, during time periods $T_2$ and $T_8$; alternately between either one of conditions 5,6 or 7 and either one of conditions 8 or 9, during time periods $T_3$ and $T_7$; alternately between either one of conditions 8 or 9 and either one of conditions 10 or 11, during time periods $T_4$ and $T_6$; alternately between either one of conditions 10 or 11, and condition 12, during time period $T_5$; alternately between either one of conditions 13 or 14 and either one of conditions 15,16 or 17, during time periods $T_{10}$ and $T_{16}$; between either one of conditions 15,16 or 17 and either one of conditions 18 or 19, during time periods $T_{11}$ and $T_{15}$; between either one of conditions 18 or 19, and either one of conditions 20 or 21, during time periods $T_{12}$ and $T_{14}$; and between either one of conditions 20 or 21, and condition 18, during time period $T_{13}$.

As in the operation of the switches 27,29,43 and 45 of FIG. 7, differential timing must be used in operating the switches 97-100 of FIG. 12, 65-68 and 97-104 of FIG. 13, and 65-70 and 97-108 of FIG. 16, to avoid voltage overstress of the switches. For the sake of simplicity, this differential timing or switching is not shown in the typical waveforms 114,116,118,120 and 122. For example, to prevent voltage overstressing of the switches in FIG. 16 switching device 69 must never be operated to the closed position with switching device 67 open, switching device 67 must never be operated to its closed position with switching device 65 open, switching device 70 must never be operated to its closed position with switching device 68 open, switching device 68 must never be operated to its closed position with switching device 66 open, switching device 105 must never be operated to its closed position with switch 106 open, switch 106 must never be operated to its closed position with switch 101 open, and so forth. In other words, the first through fourth banks of switches each must be operated in a sequential manner in switching between successively higher or lower levels of voltage.

As previously explained, in FIG. 12, the open circuit voltage ratings of the switches 65,66,97 through 100 must be at least 4E volts. In FIG. 13, whenever the circuit is placed in either one of its conditions 1,5,10,13 or 16, 8E volts is placed across the series combination of the open-circuited switches 65,67, requiring that these switches have an open circuit voltage rating of at least 4E volts. Similarly, during either one of conditions 2,4,7,9 or 11 of this circuit, 8E volts is placed across the series combination of open switches 66 and 68, requiring that these switches have an open circuit voltage rating of at least 4E volts. With the circuit in condition 9, +12E volts is applied to output terminal 110 and the top of the string of switches 99,100,103,104 and via diode 72 −4E volts to the bottom of this string of switches, thereby placing 16E volts across this series string of switches requiring that each one of the switches have a voltage rating of at least 4E volts. When the circuit is placed in condition 15, −12E volts is applied to output terminal 110 and 16E volts across the series string of open switches 97,98,101,102 requiring that each one of these switches have a voltage rating of at least 4E volts. A similar analysis of the circuit of FIG. 16, as can be readily made by one skilled in the art, shows that the voltage rating for each one of the switches 65-70 and 97-108 must be at least 4E volts.

In comparing the first, second and third embodiments of the invention and FIGS. 11,13 and 16, respectively, one skilled in the art should readily recognize a pattern between these embodiments for extending the circuit of FIG. 16 to the Nth embodiment, as will be described. For the purposes of explanation, with reference to FIG. 16, let the switches 65,67 and 69 between terminals 113 and 121 be designated as a first bank of switches, switches 66,68 and 70 between terminals 115 and 121 be designated as a second bank of switches, switches 97,98,101,102,105 and 106 located between terminals 110 and 117 be designated as a third bank of switches, and switches 99,100,103,104,107 and 108 located between terminals 110 and 119 be designated as a fourth bank of switches. A comparison of the circuits of FIGS. 12 and 13 with that of FIG. 16 shows that each has comparable first through fourth banks of switches differing only in numbers of switches in each bank as between circuits, and that for each one of these circuits or invention embodiments the number of switches in the third and fourth banks are always twice that of the numbers of switches in the first and second banks of switches for each embodiment. If N is designated as the number of switches in either one of the first or second banks of switches, N being any integer number 1,2,3,4 . . . , then the number of switches in the third and fourth banks of switches can each be designated generally as 2N. If the back-to-back connected diodes located between the first switching bank and the common connection points of the upper half of the series-connected capacitors are taken as diode pairs, then in general the number of these diodes pairs can be designated as (N-1), as can the numbers of pairs of oppositely-polarized back-to-back connected pairs of diodes in the lower half of the circuit. Similarly, the diodes in the upper half of the circuit connected between the third bank of switches and the common connections between the series-connected capacitors are generally equal in number to the quantity (2N-1), as are the diodes located in the lower half of the circuit between the fourth bank of switches and the common connections between the series string of capacitors. If individual batteries of voltage E volts are connected in a series string as illustrated in the Examples of the circuit of FIGS. 11,13 and 16, then in general the numbers of batteries in the upper half of the circuit can be designated as 2N, the same for the batteries in the lower half of the circuit, the total number of batteries being equal to the quantity 4N. As for the interconnections of the elements in the various embodiments of the invention, in comparing the circuits of FIGS. 11,13 and 16, for progressively higher embodiments of the invention, respectively, note that the common connection point A between the upper bank of batteries and the lower band of batteries is always connected to the reference terminal 51 (in this example the reference terminal being connected to ground), that the common connection between the first and second banks of switches is always connected to the centralmost or intermediate common connection point of the series-connected capacitors, that diode 71 is always connected between the uppermost switch of the first bank of switches and the end of the uppermost capacitor of the series-connected capacitors, and polarized for passing current from the string of batteries to the string of capacitors and the bank of third switches, that the diode 72 is always connected between the lowermost ends of the second bank of switches and the string of capacitors, and polarized for passing current from the string of capacitors and/or fourth bank of switches to the second bank of switches and/or lower bank of batteries. Also note that the common connection between the third and fourth banks of switches is always connected to the output terminal 110. Except for the first embodiment of the invention of FIG. 12, where there is only one switch in the first and second banks of switches, the progression from the second embodiment of FIG. 13 to the third embodiment of FIG. 16 and beyond shows that the common connection between the uppermost two switches of the first bank of switches is always connected via a diode to the common connection between the uppermost grouping of four batteries and the next lower grouping of four batteries, and that the common connection between the succeedingly lower pair of a different two switches of the first bank of switches are connected via a diode to the correspondingly next succeeding common connections between the next succeeding different two groups of four batteries, and so forth. Similarly, the common connection between the uppermost two switches of the second bank of switches (switches 66 and 68) is always connected via a diode to the common connection between the uppermost two groups of four batteries, and the next succeeding common connections between the switches of the second bank of switches is connected to the next succeeding common connections between the next-occurring two groups of four batteries, as shown. From the foregoing description, one skilled in the art would readily be able to construct any one of the first through Nth embodiments of the invention by comparing FIGS. 11,13 and 16 and referring to the word description just given.

When N is odd, there is no connection between the first or second banks of switches and the reference terminal of the corresponding embodiments of the invention. Accordingly, only waveforms having dynamic zeros, such as waveforms 114, 120 and 122, for example, can be obtained for odd-numbered embodiments. This is not true for even-numbered embodiments of the invention (N being an even number), where either dynamic or static zeros are obtainable for the waveforms of such even-numbered embodiments, because there is a connection between the reference terminal and the common connection of the first and second banks of switches. The second embodiment of the invention, for N=2 (see FIG. 13), provides for a synthesis of a waveform having a static zero such as waveform 118, or a dynamic zero such as waveform 116, for example. The circuits given for the first through third embodiments of the invention, shown in FIGS. 11, 13 and 16, respectively, are balanced systems, wherein the positive and negative operating voltages are of equal magnitude, the numbers of switches in the first and second banks of switches are equal in number, and the number of switches in the third and fourth banks of switches are equal in number, and the number of capacitors in the upper half of the circuit is always equal to the number of capacitors in the lower half of the circuit. In certain applications this may not be true, and unbalanced versions of the various embodiments of the invention may be required, but in general balanced systems are preferred from both an efficiency and energy-saving standpoint. The peak level of the output voltage from the generalized embodiment of the invention is equal to 6NE volts, assuming a balanced system. In the examples given, this peak voltage is equal to three times the level of the positive and negative DC operating voltages available in each embodiment.

For the purposes of further explanation and description, a gated power path is herein defined as a current path between the output terminal 110 and some given level of operating voltage, wherein the current path can be selectively opened or closed, and a gated ground path is herein defined as a current path connected between output terminal 110 and ground that can be selectively opened and closed. Accordingly, when N is odd, only gated power paths can be obtained for the associated embodiments of the invention, whereas whenever N is even, the gated power and gated ground paths are obtainable from the associative even embodiments of the invention. For example, in FIG. 13, a gated power path is formed by switches 65,67,99 and 103. Another gated power path is formed by switches 65,67,98 and 102, and diode 87. In condition 4 of FIG. 13, the switches in each one of these power paths are closed (see Table III), providing for the flow of current from the series-connected batteries 52,54,56 and 57 to the load whenever the voltage across the load is less than +4E volts via the latter gated power path, and the flow of current from the load through the former gated power path to these batteries whenever the voltage across the load is greater than +4E volts. In condition 3 of the circuit of FIG. 13, a gated ground path for conducting current from terminal 51 to output terminal 110 is formed by diode 80, switches 65,98 and 102, and diode 87, and a second gated ground path for conducting current from output terminal 101 to reference terminal 51 is formed by switches 66,99, and 103, and diodes 88 and 81. Note that these gated ground paths have a common connection between capacitors 73 and 74. Similarly, one skilled in the art would note that many other gated ground and gated power paths are obtainable in the circuit of FIG. 13.

Note that as one proceeds towards progressively higher level embodiments of the present invention, progressively higher levels of DC voltage are capable of being converted into a desired AC waveform. The higher voltage conversion capability of progressively higher embodiments of the invention is possible because greater numbers of switches are connected in series in each one of the four banks of switches of the embodiments as one progresses to higher embodiments of the invention. Also, as is known to one skilled in the art, greater current-carrying capability is obtained from connecting various ones of the switching devices of the four banks of switches of each embodiment in parallel with substantially similar switching devices, to the degree required. If in a given application, more than a single-phase output voltage is required, it is possible to connect more than one circuit of a given embodiment of the invention to an appropriate bank of batteries and to operate the circuits in proper phase relationship to one another for obtaining a desired multiphase output voltage. For example, three like embodiments of the invention could be connected to the same bank of batteries and operated at 120° out of phase with one another for producing a three-phase output voltage. A microprocessor (or other types of controllers) is applicable for use in providing the control signals for operating each individual switch of the various embodiments of the invention.

Figure 19:
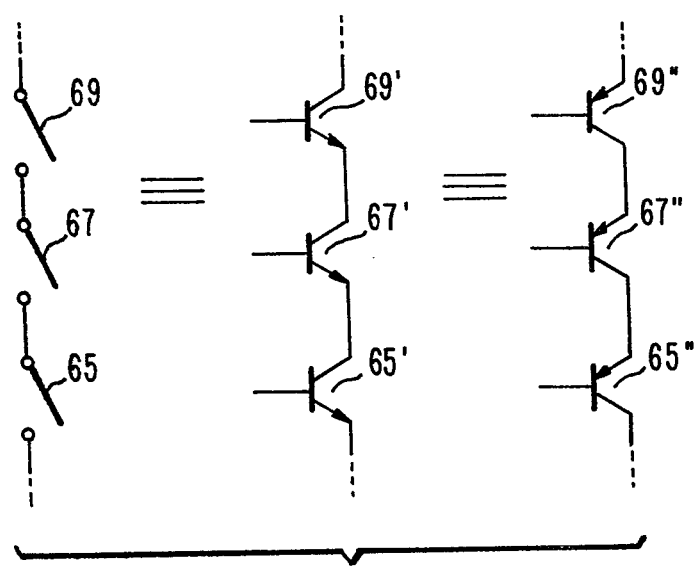
FIG. 19 shows the functional equivalence between series-connected single-pole-single-throw switches and the cascoded combination of bipolar transistors and FIG. 20 is a circuit schematic diagram of a floating transistorized switch for providing each one of the single-pole-single-throw switches in each embodiment of the invention.

In FIG. 19, it is illustrated that a bank of series-connected SPST switches such as 65,67 and 69, for example, is equivalent to a cascoded bank of NPN transistors 65', 67' and 69', or to a cascoded bank of PNP transistors 65", 67" and 69". In practice, it is preferred that the SPST switching device of the various embodiments of the invention be provided by solid-state switching devices such as bipolar transistors, or other solid-state devices capable of providing the necessary switching function such as silicon-controlled rectifiers, for example. As previously mentioned, mechanical SPST switches are shown in the circuit schematic diagrams of the various embodiments of the invention for the sake of simplicity, but for obtaining the levels of reliability and speed required from practical converter circuits, it is especially desirable that the switching function be provided by solid-state devices. A microprocessor or other suitable controllers are applicable for use in supplying the control signals for operating the switching devices of the present invention.

Figure 20:
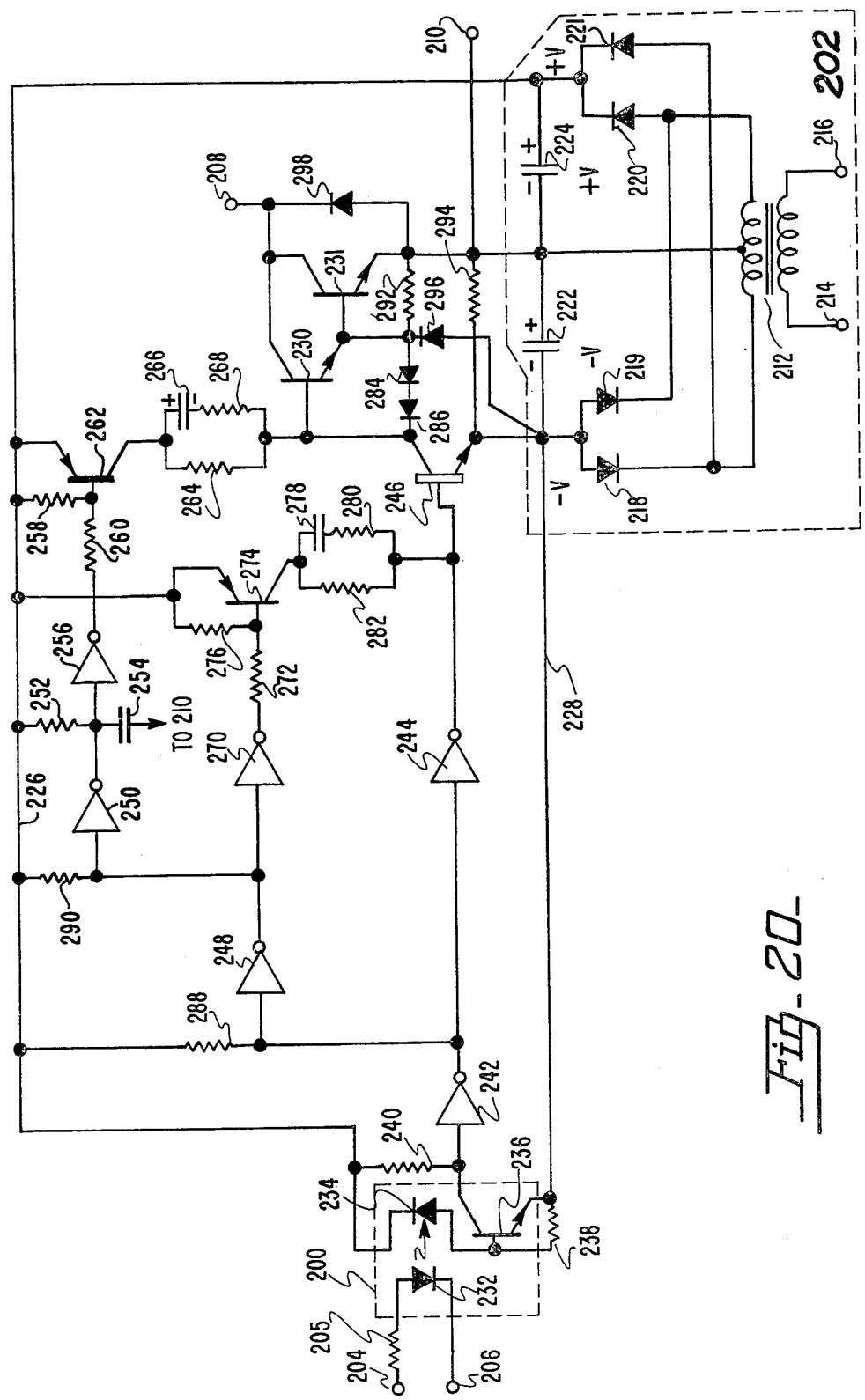

In FIG. 20, there is shown a switching circuit preferred for use in providing each individual single-pole-single-throw switching device shown in the circuits of FIGS. 11,13 and 16 of the present invention. This switching circuit is the subject of applicant's co-pending application Ser. No. 944,632, filed on Sept. 21, 1978 for FLOATING TRANSISTORIZED SWITCH, where the operation and circuit is described in detail. Applicant developed this switching circuit specifically to overcome the problems in the prior art in obtaining reliable operation of switching circuits having more than two transistors connected in cascode (see FIG. 19) for switching relatively high levels of voltage. Important features of the switching circuit of FIG. 20 include the optical coupler 200 and local power supply 202. The optical coupler 200 electrically isolates the switching circuit from the source of control signals (a microprocessor, for example) connected between input terminals 204, 206, permitting the levels of voltage at the power terminals 208 and 210 to float up and down independently of the voltage applied across the input terminals 204,206. The local supply 202 includes a transformer 212, which serves both to isolate the source of AC voltage applied between terminals 214 and 216 from other portions of the switching circuit, and to provide via secondary winding a predetermined level of AC voltage for driving the full-wave bridge rectifier of diodes 218–221. The center tap of the secondary winding of the transformer 212 is connected in common to power terminal 210 and filter capacitors 222 and 224, thereby referencing the DC operating voltages +V and −V whatever voltage is applied to the power terminal 210. These operating voltages +V and −V are applied to operating voltage rails or buses 226, 228, respectively. Referencing of the operating voltages +V and −V to the voltage applied to power terminal 210 ensures that the operating voltage levels will remain at the proper operating levels relative to the voltage at power terminal 210, thereby permitting the switching circuit to be included at any position within a cascoded chain or string of such switching circuits of FIGS. 11,13 and 16.

Operation of the circuit of FIG. 20 will now be described. Assume that the switching circuit is turned off, in which condition the Darlington circuit 230,231 is turned off, thereby causing a substantially high impedance to exist between power to output terminals 208 and 210. This is analogous to an open single-pole-single-throw switch having contacts represented by terminals 208 and 210. To turn on the switching circuit, a control signal is applied between input terminals 204 and 206, for causing a current $i_T$ to flow as shown through the current-limiting resistor 205, and the light-emitting diode 232 of the optical coupler 200. In response to this flow of current, diode 232 emits infrared radiation which is detected by the photodiode 234. The photodiode 234 responds to this light by substantially lowering its impedance, thereby permitting current to flow from voltage rail 226 (the +V voltage side of local supply 202) into the base electrode of transistor 236 of the optical coupler 200, and through the resistor 238 to the −V operating voltage rail 228, causing transistor 236 to turn on. When transistor 236 so turns on, current flows from the positive voltage rail 226, through resistor 240 and the collector-emitter current path of transistor 236 to the negative voltage rail 228, in turn causing the level of voltage at the input terminal of inverter 242 to decrease in potential from substantially +V to −V volts. In response to this drop in voltage at its input terminal, inverter 242 changes the level of the voltage at its output terminal from a relatively low level to a relatively high level. Inverter 244 changes the condition of the level of its output signal from a relatively high level to a relatively low level (about −V volts), in response to the change in the level of the output signal from inverter 242, thereby "pulling down" the base electrode of Darlington transistor 246, the latter remaining in a saturated state because of minority charge carrier storage in its base region. Before Darlington transistor 246 becomes unsaturated because of the recombination of minority carriers in the base region, inverter 248 changes the level of its output signal from a high level to a low level, in response to the change in the level of the output signal from inverter 242. Inverter 250 changes the level of its output signal from a low level to a high level with a time delay determined by the values of resistor 252 and capacitor 254, in response to the low level output signal from inverter 248. When the now positive-going output signal from inverter 250 exceeds the input threshold level of inverter 256, the latter responds by changing the level of its output signal from a high level to a low level, causing current to flow from the positive rail 226 through resistors 258 and 260 into the output terminal of inverter 256, and from the base electrode of transistor 262 through current-limiting resistor 260 into the output terminal of inverter 256. In this manner, transistor 262 is turned on about two microseconds after the change in the output signal of inverter 242 from a low level to a high level. When transistor 262 so turns on, substantially +V volts is applied via the emitter-collector current path of transistor 262 (now having a substantially low impedance), and the combination of resistor 264 in parallel with the series circuit of capacitor 266 and resistor 268, to the collector electrode of Darlington transistor 246, causing the latter to come out of saturation and turn off. When Darlington transistor 246 comes out of saturation, the large transient current flowing through capacitor 266 and resistor 268 (controls magnitude of current) flows into the base electrode of transistor 230, overdriving the Darlington circuit 230,231 to cause it to turn on in a substantially short period of time (transistors 230 and 231 turned on). After the turnon overdrive transient current subsides due to the charging of the speedup capacitor 266, the magnitude of the base current applied to the base electrode of transistor 230 is controlled by the value of resistor 264 for maintaining the Darlington circuit 230,231 turned on. When the Darlington circuit 230,231 so turns on, the impedance between the collector and emitter electrodes of transistor 231 is substantially reduced, for connection power terminal 208 to output terminal 210, permitting current to flow therebetween. At this time, in response to the low level of output signal from inverter 248, inverter 270 is producing a high level of output signal for application via resistor 272 to the base electrode of transistor 274, keeping this transistor turned off.

When the switching circuit of FIG. 1 is operated as described above for turning on the output Darlington 230, 231, and thereafter it is desired to turn off this Darlington circuit, the input signal applied across terminals 204 and 206 is removed to interrupt the current $i_T$ flowing through the light-emitting diode 232. Next, in sequential order, the impedance of photodiode 234 substantially increases, preventing the flow of base current for transistor 236, causing transistor 236 to turn off. When transistor 236 turns off, the voltage at its collector electrode rises toward the positive rail 226, causing about +V volts to be applied to the input terminal of inverter 242, the latter responding by changing the level of its output signal from a high level to a low level, the inverters 244 and 248 responding thereto by changing the level of their output signals from a low level to a high level. When the output signal from inverter 248 goes high, inverter 270 responds thereto by changing the level of its output signal from a high level to a low level, permitting current to flow from the positive rail 226 through the resistors 276 and 272 into the output terminal of inverter 270. Also, base current flows from transistor 274 through resistor 272 into the output terminal of inverter 270, thereby turning on transistor 274, causing a large transient current to flow from the positive rail 226 through the collector-emitter current path of transistor 274, and substantially through the speedup circuit of capacitor 278 and resistors 280 and 282, into the base electrode of Darlington transistor 246, thereby providing fast turnon of this Darlington transistor. The time constant of the speedup circuit 278,280,282 is such that shortly after the Darlington transistor 246 turns on, capacitor 278 charges, and the sustaining current for keeping on the Darlington transistor 246 is provided via resistor 282 and the collector-emitter current path of transistor 274 from the positive rail 226. The hard turnon of Darlington transistor 246 overrides the static "on current" flowing from resistor 264 into the base electrode of transistor 230, and causes a large current to flow out of the bases of transistors 230 and 231, with the base current from transistor 231 flowing into the collector electrode of Darlington transistor 246 via the current path provided by diodes 284 and 286. This causes the output Darlington 230,231 to go out of saturation and rapidly turn off with correspondingly low turned-off power dissipation. Note that at the same time Darlington transistor 246 turns on, inverter 250 changes its output signal from a high level to a low level, in response to the high level output signal from inverter 248. Inverter 256 changes the level of its output signal from a low level to a high level, in response to the change in level of the output signal from inverter 250, thereby turning off transistor 262. Also note that resistors 288 and 290 serve as "pull-up" resistors for inverters 248 and 250, respectively; that resistors 292 and 294 serve as biasing resistors; and that diode 296 permits the collector-base junctions of transistors 230 and 231 to be discharged with the $V_{CE}$ across these transistors drops from a high positive to a relatively low positive value. The antiparallel diode 298 across Darlington circuit 230,231 is included to provide bilateral current flow for the Darlington switching circuit 230,231, whereby when the switching circuit turns off current can flow from reactive loads connected to output terminal 210 through diode 298 and into power terminal 208. To connect a plurality of switching circuits identical to FIG. 20 in cascode, the terminal 208 of a first individual circuit is connected to the terminal 210 of a second individual circuit, and the terminal 210 of the first individual circuit is connected to the terminal 208 of a third individual circuit, and so forth.

What is claimed is:

1. An inverter circuit for converting DC voltages in a range between +NE volts into an AC voltage having a multitier waveform, where N is any integer number 1, 2, 3, 4, 5 . . . , comprising:

first and second terminals for receiving first and second operation voltages, respectively;

third, fourth and fifth terminals;

an output terminal;

a reference voltage terminal for connection to a point of reference potential;

a plurality of N first and N second switching means each having a main current conduction path, each being selectively operable to one of a first condition or a second condition, for opening and closing, respectively, their main current conduction path, the main current conduction path of said N first switching means being connected in series between said first and fourth terminals, the main current conduction paths of said N first and N second switching means being connected in series between said first and fourth, and second and fourth terminals, respectively;

a plurality of N first and N second electrical charge storage means connected in series between said third and fourth, and fourth and fifth terminals, respectively;

first unidirectional current means connected between and polarized for passing current from said first to said third terminals;

second unidirectional current means connected between and polarized for passing current from said fifth to said second terminals;

a plurality of (N−1) pairs of third and (N−1) pairs of fourth unidirectional current means, said (N−1) pairs of third unidirectional current means being connected individually in series between the common connection points of each succeeding different two of said plurality of N first switching devices, and the corresponding levels of common connection points relative to said third terminal of each succeeding different two of said plurality of N first electrical charge storage means, respectively, each pair of third unidirectional current means being polarized for permitting current to flow from their own common connection point to their associative common connection points of said N first switching means and said N first charge storage means, respectively, said (N−1) pairs of fourth unidirectional current means each being connected individually in series between the common connection points of each succeeding different two of said plurality of N second switching devices, and the corresponding levels of common connection points relative to said fourth terminal of said plurality of N second electrical charge storage means, respectively, each pair of fourth unidirectional current means being polarized for conducting current from their own common connection point to their associative common connection points of said N second switching means and said N second charge storage means, respectively;

a plurality of 2N third and 2N fourth switching means each having a main current conduction path, the main current conduction paths of said 2N third switching means being connected in series between said third and output terminals, the main current conduction paths of said 2N fourth switching means being connected in series between said output and fifth terinals, each one of said 2N third and 2N fourth switching means being selectively operable to one of a first condition or a second condition, for opening and closing, respectively, their main current conduction paths;

a plurality of (2N−1) fifth and (2N−1) sixth unidirectional current means, said (2N−1) fifth unidirectional means being individually connected between the common connection points of each succeeding different two of the series string of said N first and N second electrical charge storage means, and the corresponding levels of common connection points relative to said third terminal of each succeeding different two of said plurality of 2N third switching means, said (2N−1) fifth unidirectional means each being polarized for conducting current from the associative connection point in said string of N first and N second electrical charge storage means to their associative point in said series string of 2N third switching means, said (2N−1)sixth unidirectional means each being polarized for conducting current from their associative connection point in said string of 2N fourth switching means to their associative connection point in said string of said N first and N second electrical charge storage means;

DC voltage supply means connected between said first and second terminals, for supplying +2NE volts and −2NE volts to these terminals, respectively, and for individually applying progressively less positive fixed levels of voltage to the midpoints of each one of said (N−1) pairs of third unidirectional current means relative to said first terminal, the midpoints of said (N−1) pairs of fourth unidirectional current means relative to said fourth terminal being connected individually to like positioned midpoints of said (N−1) pairs of third unidirectional current means relative to said first terminal, said DC voltage supply means having a common point connected to said reference voltage terminal;

said pluralities of N first, N second, 2N third and 2N fourth switching means being operable to various combinations of their first and second conditions for producing substantially any practical AC voltage having a multitiered waveform with a peak-to-peak amplitude of up to +NE volts, and a predetermined' frequency.

2. The inverter circuit of claim 1 wherein said N first and N second switching means consist of like conductivity transistors connected in cascode.

3. The inverter circuit of claim 1, wherein said 2N third and 2N fourth switching means consist of like conductivity transistors connected in cascode.

4. The inverter circuit of claim 1, wherein said first and second unidirectional current means each include a diode.

5. The inverter circuit of claim 1, wherein said (N−1) pairs of third and fourth unidirectional current means each include two diodes.

6. The inverter circuit of claim 1, wherein said (2N−1) fifth and sixth unidirectional current means each include a diode.

7. The inverter circuit of claim 1, wherein said plurality of N first and N second electrical charge storage means each include a capacitor.

8. A DC to AC converter circuit comprising:
first and second operating voltage terminals;
an output terminal;
a reference voltage terminal for connection to a point of reference potential;
a plurality of DC voltage supply means connected in series between and for applying positive and negative voltages to said first and second operating voltage terminals, respectively, the connections between said DC voltage supply means forming a plurality of nodal points, a substantially intermediate one of said nodal points being connected to said reference voltage terminal, thereby causing the polarity of the voltages at said nodal points between said reference voltage terminal and first operating voltage terminal to be positive, and between said reference voltage terminal and second operating voltage terminal to be negative, with respect to said point of reference potential;
a plurality of first single-pole-single-throw switching means connected in series between said first and second operating voltage terminals;
a plurality of electrical charge storage means connected in a series string, the number of said charge storage means being the same as the number of said plurality of first switching means, the common connection point between the centralmost two of the latter being connected to the common connection point between the centralmost two of the former;
a plurality of second single-pole-single-throw switching means connected in series with one another, the intermediate point of this series string of second switching means being connected to said output terminal, the number of said plurality of second switching means being twice that of said plurality of first switching means;
first unidirectional current means connected between and polarized for conducting current from said first operating terminal to one end of said series string of second single-pole-single-throw switching means, and to one end of said string of electrical charge storage means;
second unidirectional current means connected between and polarized for conducting current from the other ends of said series strings of second switching means and of electrical charge storage means to said second operating voltage terminal;
a plurality of third unidirectional current means, one less in number than one-half of said plurality of first switching means, individually connected between and polarized for passing current from substantially successive nodes of said plurality of series-connected DC voltage supply means, relative to said first operating terminal, to successive common connections between each successive two of said plurality of first switching means located between said first operating voltage terminal and the intermediate common connection of the former, and also relative to said first operating voltage terminal, respectively;

a plurality of fourth unidirectional current means, one less in number than one-half of said plurality of first switching means, individually connected between and polarized for passing current from successive common connections between each successive two of said plurality of first switching means located between the intermediate common connection of the latter and said second operating voltage terminal, relative to this intermediate common connection, to substantially successive nodes of said plurality of series-connected DC voltage supply means, relative to said first operating voltage terminal, respectively;

a plurality of fifth unidirectional current means, equal in number to said plurality of third unidirectional current means, individually connected between and polarized for passing current from substantially successive nodes of said plurality of series-connected DC voltage supply means, relative to said first operating terminal, to successive common connections between each successive two of the half of said plurality of electrical charge storage means relative to said first unidirectional current means, respectively;

a plurality of sixth unidirectional current means equal in number to said plurality of fourth unidirectional current means, individually connected between and polarized for passing current from the successive common connections between the other half of said plurality of electrical charge storage means relative to said second unidirectional circuit means, to the substantially successive nodes of said plurality of series-connected DC voltage supply means, relative to said second operating voltage terminal, respectively;

a plurality of seventh unidirectional current means, one less in number than one-half of said plurality of second switching means, individually connected between and polarized for passing current from the successive common connections between each successive two of said plurality of electrical charge storage means to the successive common connections between each successive two of the half of said plurality of second switching means located between said first unidirectional current means and said output terminal, relative to the connection point of said first unidirectional current means with one end of each one of said strings of electrical charge storage means and first unidirectional current means, respectively; and a plurality of eighth unidirectional current means, one less in number than one-half of said plurality of second switching means, individually connected between and polarized for passing current from the successive common connections of the other half of said plurality of second switching means, relative to said output terminal, to the common connections between each successive two of said plurality of electrical charge storage means relative to the end thereof connected to said first unidirectional current means, respectively;

the individual ones of said pluralities of first and second single-pole-single-throw switching means being operable to different combinations of their open and closed circuit conditions for predetermined periods of time for producing a desired multitiered AC waveform at said output terminal for driving either one of resistive and reactive loads.

9. The converter circuit of claim 8, wherein said plurality of first single-pole-single-throw switching means includes a plurality of like-conductivity transistors connected in cascode.

10. The converter circuit of claim 8, wherein said plurality of electrical charge storage means each include a capacitor.

11. The converter circuit of claim 8, wherein said plurality of second single-pole-single-throw switching means includes a plurality of like-conductivity transistors connected in cascode.

12. The converter circuit of claim 8, wherein said first and second unidirectional current means each include a diode.

13. The converter circuit of claim 8, wherein each individual one of said pluralities of third through eighth unidirectional current means includes a diode.

* * * * *